Sept. 24, 1963   W. J. WIPKE   3,104,745
TWO-TORQUE SPRING SLIP CLUTCH
Filed July 10, 1961

INVENTOR.
WALTER J. WIPKE
BY Otto Schmid, Jr
AGENT 3,104,745
TWO-TORQUE SPRING SLIP CLUTCH
Walter J. Wipke, Lexington, Ky., assignor to International Business Machines Corporation, New York, N.Y., a corporation of New York
Filed July 10, 1961, Ser. No. 122,823
1 Claim. (Cl. 192—81)

This invention relates to clutch mechanisms and more particularly to clutch mechanisms capable of providing, on selection, two torque levels from the clutch without interruption of its operation.

It is an object of this invention to provide a clutch having two torque levels.

It is another object of this invention to provide a clutch mechanism which can be changed, while the clutch is driving, from one torque level to the other.

Still another object is to provide an improved spring clutch which is selectively operable to connect a driven member positively to a driving member by one of two torque levels.

In accordance with the principle of the invention, the clutch comprises two coil springs providing parallel connection between a drive member and a driven member, together with means to restrain one of the coil springs to remove its driving torque so that the torque level can be selectively changed without disturbing the connection between the drive member and the driven member.

Other objects of the invention will be pointed out in the following description and claim and illustrated in the accompanying drawings which disclose by way of example the principle of the invention and the best mode which has been contemplated of applying that principle.

Figure 1:
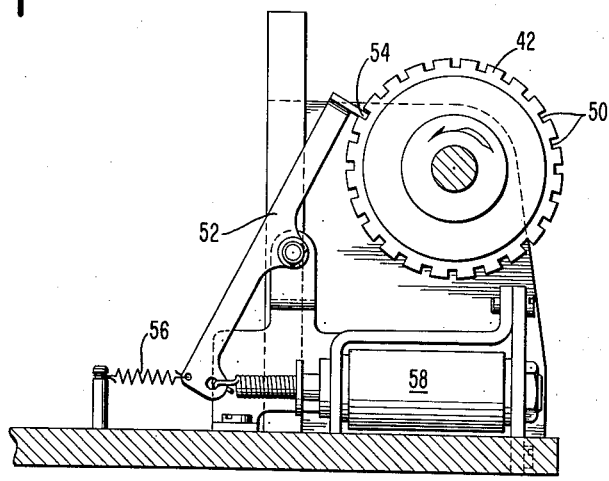
FIG. 1 is an assembly showing a two-torque spring clutch embodying the invention and, showing additionally, operating mechanism for the two-torque spring clutch.

Referring to the drawings, there is shown an embodiment of the invention, wherein a shaft 10 drives the driven shaft 12 through a pair of spring clutches 14, 16. The drive shaft 10 may be driven by any suitable power means, not shown, and it will be assumed here that the shaft 10 is driven in a counterclockwise direction (FIG. 1).

Two sleeve-shaped members 18, 20 are provided, and member 20 is fixed to the drive shaft 10 by any suitable means such as set screw 22. The other sleeve shaped member 18 is mounted on sleeve 20 and fixed thereto by set screw 24. The sleeve members 18, 20 are shaped to provide two concentric bearing surfaces 38, 34. Attached to the driven shaft 12 is a hub member 26 having concentric bearing surfaces 28, 30 and these bearing surfaces 28, 30 are aligned with bearing surfaces 38, 34 respectively. The drive member 10 and driven member 12 are connected by a low torque coiled spring 32 which is wrapped in an interference fit about the bearing surface 34 of the inner sleeve member 20 and by a high torque coiled spring 36 which is wrapped in an interference fit about bearing surface 38 of the large diameter sleeve member 18. The low torque coil spring 32 has one end fixed to the small diameter sleeve 20 by a pin 40 and is frictionally attached to the driven hub member 26 by virtue of an interference fit between the spring 32 and bearing surface 30. The high torque coil spring 36 has one end connected by a pin 41 to an outer ring 42 while the other end is free.

The springs 32, 36 are wrapped about their respective bearing surfaces in a direction which tends to unwind the springs during the transmission of torque. This connection limits the torque supplied to the driven shaft 12 to a predetermined value, and causes the springs to slip upon the driven hub 26 when the torque exceeds this predetermined value. To ensure that the high torque spring 36 will slip on the driven hub 26 instead of on the drive sleeve 18, a higher degree of interference is provided between the spring 36 and bearing surface 38 than the degree of interference between the spring 36 and bearing surface 28. Pin 40 prevents relative motion between driver and spring 32.

Figure 2:
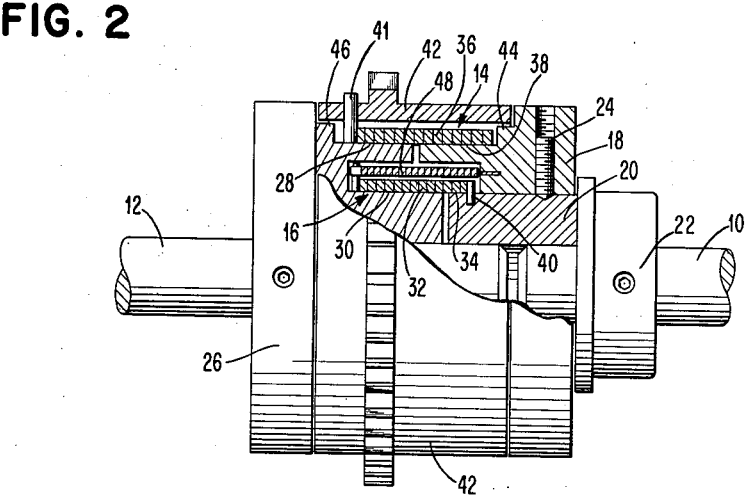
FIG. 2 is a side elevation, partially in cross-section, of the two-torque spring clutch shown in FIG. 1.

The outer ring shaped member 42 surrounds a portion of the sleeve member 18 and the hub member 26. The ring shaped member 42 is rotatably mounted on reduced hub portion 44 of the sleeve member 18 and on reduced hub portion 46 of the hub member 26. During the time the high torque is being transmitted, the outer ring member 42 rotates with the driven hub 26 due to the connection between the end of the high torque spring 36 and the outer ring member 42. However, means are provided to restrain outer ring member 42 against rotation, and, when the member 42 is so restrained, the high torque spring is caused to expand out of contact with bearing surface 28 so that only a low torque drive then takes place through low torque spring 32. The high torque spring 36 is wound in such a direction that, when its left end (FIG. 2) is stopped, the right end, in being dragged forward by surface 38 of the sleeve 18, tends to unwind the spring 36 and loosen its grip on the bearing surface 28, while maintaining a slipping frictional engagement with surface 38.

The means shown in FIG. 1 to restrain the outer ring member 42 against rotation comprises a plurality of notches 50 in the outer diameter of the ring member 42 and a hooked lever 52 which is pivotally mounted so that the hook end 54 engages the notches 50 in the ring member 42. The hook end 54 of lever 52 is urged toward the ring 42 by a spring 56 and it may be disengaged from the notches 50 by energizing a solenoid 58 the armature of which is operatively attached to the lower end of the lever 52. The energizing of the solenoid 58 causes the hook end 54 of lever 52 to disengage the notches 50 in the ring 42 and permit a high torque to be applied to the driven shaft 12 since both the low torque spring 32 and the high torque spring 36 are engaged for driving the shaft 12. To revert back to the low torque level the rotation of the ring member 42 is arrested by de-energizing the solenoid 58 which allows the notched lever 52 to move under action of the spring 56 and engage a notch 50 on the ring member 42. Since the high torque spring 36 is pinned to the ring member 42 the arresting of the ring member 42 causes the high torque spring 36 to unwind thereby removing the spring from contact with the bearing surface 28 of the hub 26 and rendering it inoperative to transfer torque to the driven shaft 12.

The value of the low torque may be adjusted within limits by an adjusting spring 48 coiled in the opposite direction to low torque spring 32. Spring 48 has one end attached to the free end of the low torque spring 32 and the other end pinned to the outer sleeve member 18. The adjustment may be made by loosening set screw 24, holding the sleeve member 20 in place and rotating sleeve member 18 with respect to sleeve member 20, and then resetting set screw 24 at the desired point of adjustment.

While the invention has been particularly shown and described with reference to preferred embodiments thereof, it will be understood by those skilled in the art that various changes in form and details may be made therein without departing from the spirit and scope of the invention.

I claim:

A clutch mechanism for selectively applying one of two torque levels to a driven member from a continuously rotating driving member, comprising:

a first coil spring fixed at one end to said driving member and frictionally engaging a first portion of said driven member, said spring being coiled about said driven member in the direction of rotation of said driving member so that said spring tends to unwind from said driven member when a predetermined torque is transmitted, thereby transmitting a first torque level;

a second coil spring coiled in the direction of rotation of said driving member and having an interference fit about a portion of said driving member and a second portion of said driven member, the degree of interference between said second coil spring and said driving member being greater than the degree of interference between said second coil spring and said driven member;

a rotatable element surrounding said second coil spring and attached to that end of said second coil spring that is in engagement with said driven member;

and means for selectively arresting the rotation of said rotatable element, said second coil spring thereby being unwound from said second portion of said driven member while maintaining a slipping frictional engagement with said driving member.

References Cited in the file of this patent
UNITED STATES PATENTS

| | | |
|---|---|---|
| 1,629,420 | Starkey | May 17, 1927 |
| 2,134,202 | Racklyeft | Oct. 25, 1938 |
| 2,242,379 | Wahl | May 20, 1941 |
| 2,475,432 | Marihart | July 5, 1949 |
| 2,930,463 | Dodge et al. | Mar. 29, 1960 |
| 2,968,380 | Sacchini et al. | Jan. 17, 1961 |